March 22, 1938.  C. A. B. MODIN  2,111,986
SAW AND SAW COLLAR
Filed Dec. 21, 1936

INVENTOR.
Carl August Bernhard Modin

ATTORNEY.

Patented Mar. 22, 1938

2,111,986

UNITED STATES PATENT OFFICE 2,111,986

SAW AND SAW COLLAR

Carl August Bernhard Modin, Fanny Bay,
British Columbia, Canada

Application December 21, 1936, Serial No. 116,970

2 Claims. (Cl. 143—155)

My invention relates to improvements in saws and saw collars, which are particularly adapted for use in shingle mills and the like.

The invention contemplates the use of a circular saw concavo convex in cross section which is designed to stretch at its periphery when running at speed until the saw lies in a single plane. In saws of this nature, particularly those which are used for sawing shingles, there is a distinct weave or vibration set up in the saw when running at speed which causes unevenness and pronounced saw marks to be made on the shingle. This vibration renders it imperative that the peripheral edge of the saw be maintained relatively thick otherwise the weave will be such as to render the shingles cut thereby to be unsalable. The general practice is to grind shingle saws of 40–60 inches diameter to a peripheral edge of 17 gauge, which appears to be the limit to which the teeth can be reduced. The present practice is to mount the saw on a saw collar with two concentric rows of screws widely spaced apart, whereas my invention contemplates maintaining generally the diameter of the outer row and increasing the diameter of the inner row to a critical dimension, and to increase the size of the hole of the saw in proportion to the diameter of inner row of screws. By changing the diameter of the inner row of screws I prevent the buckling of the plate between the inner and outer row of screws and consequently prevent the edge of the saw when running from swinging beyond the normal plane line of the saw.

The invention consists essentially of a dished circular saw secured to a saw collar with two concentric rows of fastenings in which the rows of fastenings are closer together than the diameter of the inner row, as will be more fully described in the following specification and shown in the acompanying drawing, in which:—

Figure 1:
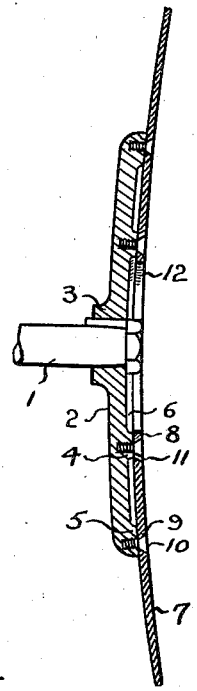
Fig. 1 is a sectional view of a saw showing the invention.
Figure 2:
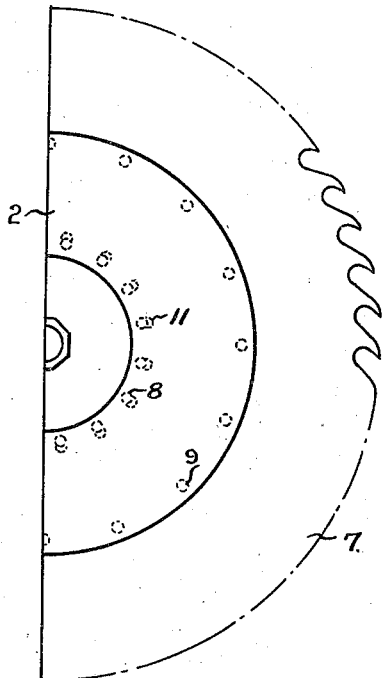
Fig. 2 is a half front view.
Figure 3:
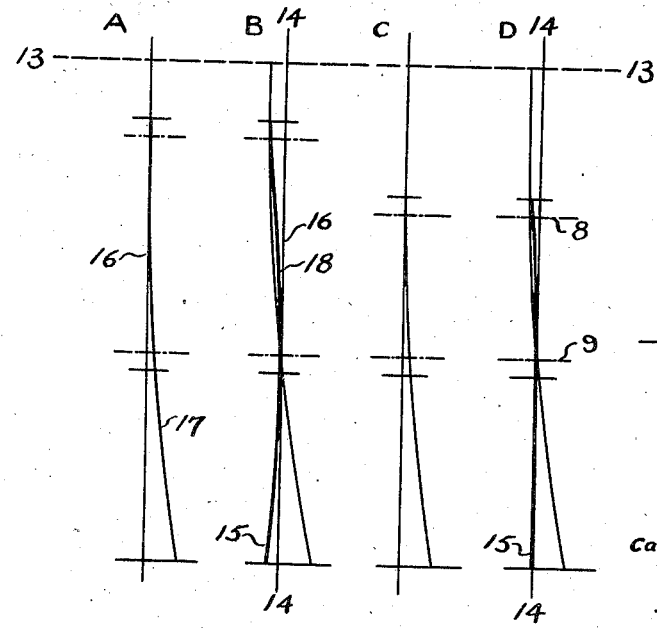

Fig. 3 is a diagram showing A a half sectional view of the present type of shingle saw at rest; B a similar half sectional view of the same saw running at normal speed; C a similar half sectional view of a saw according to the present invention at rest, and D a similar view of the saw running at normal speed.

In the drawing like characters of reference indicate corresponding parts in each figure.

The numeral 1 indicates a saw arbor to which a saw collar 2 is secured in any desired manner. The collar 2 is preferably of cast iron or steel and is provided with a central boss 3 on its outer side and a pair of concentric ribs 4 and 5 on its inner side.

The inner side of the collar is slightly dished or concave and the bearing face of the ribs 4 and 5 is dished as at 6 also to conform to the shape of the inner portion of a circular saw 7 which is dished or concavo convex in cross section. The drawing shows the concavo convex section of the parts greatly exaggerated in order to more clearly illustrate the principle underlying the invention.

The saw is provided with concentric rows of apertures 8 and 9 which receive screws 10 for the purpose of securing the saw to the collar. The apertures of the row 8 may be radially elongated slightly as indicated by the numeral 11, so as to permit a slight radial play of the inner periphery of the saw. The saw is provided with a concentric opening 12 in the usual way except that this hole is of greater diameter than the spacing between the two rows of apertures 8 and 9.

In the diagrammatic views shown in Figure 3, the chain dotted line 13—13 indicates the axis of the saw arbor of the conventional saw and collar and the one herein described; the vertical line 14—14 indicates the normal plane in which the saw is designed to lie when the saw is running at normal speed, and the line 15 is the line of a plane intersecting the points of bearing of the saw with the pitch line of the inner rib 4.

In the conventional type of saw collar the inner annulus of the saw, which is indicated by the numeral 16 and is that portion encompassed by the inner and outer ribs 4 and 5, is of such radial width that it cannot straighten out with the same freedom as the outer annulus 17 which is unconfined at its outer periphery. The free edge of the saw when rotating at speed imposes a strain therefore on the inner annulus which causes it to buckle or assume a cross sectional curvature opposite to that which it possesses when the saw is at rest as at 18, hence the free edge of the outer annulus momentarily swings beyond the plane line 14—14 to the left as at 15. As it returns to the plane line, the inner annulus snaps back towards its original curvature, thus swinging the free edge of the saw to the right of the line 14—14 and this action is continually repeated during the running of the saw with the result that saw marks of a definite character are always present on the shingles cut.

With the present invention the hole in the centre of the saw is greatly enlarged, leaving less material and a smaller curvature of the inner annulus to be distorted, consequently the rotation of the saw at speed never buckles the inner annulus to a point where endwise compression of the metal is added to its inherent spring to cause it to snap back towards its original form and consequently the centrifugal pull on the saw gradually causes the outer annulus to straighten out towards the line 14—14 and not beyond it and the curvature of the inner annulus is urged towards said line. Furthermore, the periphery of the saw runs steady and true without perceptible vibration which of itself leaves a far better saw surface than that previously obtained and permits the edge to be ground to a smaller gauge, thus reducing the effort required to drive the saw and increasing the number of shingles cut from a given shingle bolt.

What I claim as my invention is:

1. In a saw mounting including an arbor and a circular saw concavo convex in cross section, a collar for supporting the saw upon the arbor, said collar having an inner and an outer concentric ridge on one side to which the saw is adapted to be fastened, the faces of said ridges being offset from each other to conform to the transverse curvature of the saw.

2. Saw collar adapted for mounting on an arbor and to support a circular saw concavo convex in cross section, said collar having an annular concentric depression bounded by concentrically disposed fastening means for securing the saw to the collar, said depression being deep enough to permit the inner portion of the saw bridging the depression to flex with the weaving of the periphery of said saw.

CARL A. B. MODIN.